United States Patent
Lakatos et al.

(10) Patent No.: US 10,275,665 B2
(45) Date of Patent: Apr. 30, 2019

(54) DEVICE AND METHOD FOR DETECTING A CURBSTONE IN AN ENVIRONMENT OF A VEHICLE AND SYSTEM FOR CURBSTONE CONTROL FOR A VEHICLE

(71) Applicant: Robert Bosch GmbH, Stuttgart (DE)

(72) Inventors: Peter Lakatos, Budapest (HU); Peter Pozsegovics, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 107 days.

(21) Appl. No.: 15/406,260

(22) Filed: Jan. 13, 2017

(65) Prior Publication Data
US 2017/0220878 A1 Aug. 3, 2017

(30) Foreign Application Priority Data
Jan. 28, 2016 (DE) .................. 10 2016 201 304

(51) Int. Cl.
| | |
|---|---|
| *G06K 9/46* | (2006.01) |
| *G06T 7/73* | (2017.01) |
| *G08G 1/16* | (2006.01) |
| *G06K 9/00* | (2006.01) |
| *H04N 7/18* | (2006.01) |

(52) U.S. Cl.
CPC ....... *G06K 9/00798* (2013.01); *G06K 9/4604* (2013.01); *G06T 7/74* (2017.01); *G08G 1/165* (2013.01); *H04N 7/183* (2013.01)

(58) Field of Classification Search
CPC .............................. G06K 9/00798; G06T 7/74
See application file for complete search history.

(56) References Cited

U.S. PATENT DOCUMENTS

| | | | | | |
|---|---|---|---|---|---|
| 5,904,725 | A | * | 5/1999 | Iisaka | .................. G01S 5/16 348/116 |
| 6,590,521 | B1 | * | 7/2003 | Saka | .................. G01S 13/931 180/167 |

(Continued)

FOREIGN PATENT DOCUMENTS

EP 2431917 A1 * 3/2012 ......... G06K 9/00798

OTHER PUBLICATIONS

Rodríguez-Cuenca, "An approach to detect and delineate street curbs from MLS 3D point cloud data" Automation in Construction 51 (2015).*

*Primary Examiner* — Jamie J Atala
*Assistant Examiner* — Michael Robert Cammarata
(74) *Attorney, Agent, or Firm* — Norton Rose Fulbright US LLP; Gerard Messina

(57) ABSTRACT

A method for detecting a curbstone in an environment of a vehicle. The method includes recognizing at least one line segment that belongs to the curbstone with the aid of image data that are read in by an interface to a camera device of the vehicle. The line segment is projected onto a ground plane of the environment in order to generate a projected line segment. A subset of a plurality of three-dimensionally triangulated points in the environment of the vehicle is assigned to the line segment as a function of a position of the points relative to a position of the camera device, relative to a starting point of the projected line segment, and relative to an end point of the projected line segment. A flank plane of the curbstone is ascertained with the aid of the assigned points.

13 Claims, 5 Drawing Sheets

(56) References Cited

U.S. PATENT DOCUMENTS

| | | | | |
|---|---|---|---|---|
| 6,978,037 B1* | 12/2005 | Fechner | ............ | G06K 9/00798 382/103 |
| 8,229,169 B2* | 7/2012 | Nakamura | ............ | G01C 21/26 382/103 |
| 8,320,615 B2* | 11/2012 | Hamza | ............... | G06K 9/00798 382/103 |
| 8,411,900 B2* | 4/2013 | Naka | ................. | G06K 9/00208 340/436 |
| 9,245,188 B2* | 1/2016 | Han | .................. | G06K 9/00798 |
| 9,251,708 B2* | 2/2016 | Rosenbaum | ....... | G06K 9/00805 |
| 9,280,711 B2* | 3/2016 | Stein | ................ | G06K 9/00798 |
| 9,454,156 B2* | 9/2016 | Chung | ............... | G05D 1/0231 |
| 9,529,087 B2* | 12/2016 | Stainvas Olshansky | .................... | G01S 17/936 |
| 9,529,088 B2* | 12/2016 | Kim | ..................... | G01S 17/936 |
| 9,547,795 B2* | 1/2017 | Gupta | ............... | G06K 9/00805 |
| 9,607,227 B2* | 3/2017 | Takemae | ........... | G06K 9/00798 |
| 9,676,330 B2* | 6/2017 | Takemae | ................. | B60R 1/00 |
| 9,846,812 B2* | 12/2017 | Sibiryakov | ............. | G06K 9/46 |
| 9,870,437 B2* | 1/2018 | Pope | .................. | G06F 17/5004 |
| 9,916,509 B2* | 3/2018 | Springer | ............. | G06K 9/4604 |

* cited by examiner

DEVICE AND METHOD FOR DETECTING A CURBSTONE IN AN ENVIRONMENT OF A VEHICLE AND SYSTEM FOR CURBSTONE CONTROL FOR A VEHICLE

CROSS REFERENCE

The present application claims the benefit under 35 U.S.C. § 119 of German Patent Application No. DE 102016201304.1 filed on Jan. 28, 2016, which is expressly incorporated herein by reference in its entirety.

FIELD

The present invention relates to a device, a system, and a method for detecting a curbstone in an environment of a vehicle. A computer program is also described.

BACKGROUND INFORMATION

A vehicle is able to be equipped with a vehicle camera, for example. Such a vehicle camera may be designed to record an environment of the vehicle. Objects such as stationary objects in the form of obstacles or the like may be situated in the environment.

SUMMARY

Against this background, a method as well as a device using this method and finally, a corresponding computer program are provided.

According to specific embodiments, for instance, a curbstone detection is able to be realized with the aid of a camera equipped with a fish-eye lens. In this case, the curbstone detection may also be made possible by a system on the basis of a near-range camera platform, for example. More specifically, a detection of a curbstone in a vehicle environment is able to be carried out for a vehicle, and additionally or alternatively, a control with regard to a position of a curbstone relative to the vehicle is implementable, in which, for example, a three-dimensional representation of the curbstone is able be generated and utilized even on the basis of a single camera.

According to specific embodiments, for example, the position and the shape of a curbstone are advantageously able to be detected in a reliable manner. In particular, this may also be possible when using only a single vehicle camera. Moreover, a positional relationship between the curbstone and the vehicle, for example, can be monitored and controlled in addition. This therefore makes it possible to improve a vehicle guidance and to increase the vehicle safety. The curbstone detection and the curbstone control are able to be executed in an exact, reliable and uncomplicated manner.

A method for detecting a curbstone in an environment of a vehicle is presented, the method including, for example, the following:

Detecting at least one line segment that is part of the curbstone with the aid of image data that are read in by an interface to at least one camera device of the vehicle, the image data representing the environment of the vehicle;

Projecting the at least one line segment onto a ground plane of the environment in order to generate a projected line segment;

Allocating at least a subset of points triangulated from a plurality of three-dimensionally triangulated points in the environment of the vehicle to the at least one line segment as a function of a position of the points relative to a position of the camera device, relative to a starting point of the projected line segment, and relative to an end point of the projected line segment, the three-dimensionally triangulated points corresponding to object points in the environment of the vehicle; and Ascertaining a flank plane of the curbstone with the aid of the assigned points.

This method, for example, may be implemented in software or hardware or in a mixed form of software and hardware, in a control device, for example. The vehicle may be a motor vehicle, in particular a road vehicle such as a passenger car, commercial vehicle or the like. The at least one camera device may be equipped with a fish-eye lens. In the step of assigning, three-dimensionally triangulated points are able to be assigned or allocated to the at least one line segment and additionally or alternatively, to the curbstone. The flank plane may include a detected line segment and represent a surface of the curbstone that is inclined with respect to the ground plane. The ground plane may represent a roadway plane or a plane that is shifted in parallel with the roadway plane.

According to one specific embodiment, in the step of assigning it can be checked whether the three-dimensionally triangulated points maximally have a predefined distance from a separation plane. Here, the separation plane may be defined by the position of the camera device, the starting point of the projected line segment and the end point of the projected line segment. Such a specific embodiment offers the advantage of allowing a reliable identification of features potentially belonging to a curbstone. Outlier points especially with regard to a first dimension are able to be disregarded in the process.

During the step of assigning, it may also be checked whether the three-dimensionally triangulated points are situated within a triangle that is defined by the position of the camera device, the starting point of the projected line segment, and the end point of the projected line segment when the three-dimensionally triangulated points are projected onto a separation plane which is defined by the position of the camera device, the starting point of the projected line segment, and the end point of the projected line segment. Such a specific embodiment offers the advantage of allowing a reliable and precise identification of the features that are part of a curbstone. Outlier points with regard to a second dimension and a third dimension are therefore able to be disregarded, in particular.

In addition, in the step of ascertaining, the flank plane can be ascertained as a function of whether the assigned points are situated at a predefined distance interval from the ground plane of the environment. In other words, the step of ascertaining may be carried out when the assigned points are situated at the predefined distance interval from the ground plane of the environment. It is also possible to use an average distance of the points for this purpose. Such a specific embodiment offers the advantage of allowing an even more reliable and precise curbstone detection.

In the step of ascertaining, it is additionally possible to ascertain the flank plane as a function of whether a predefined minimum number of points have been assigned in the step of assigning. In other words, the step of ascertaining may be carried out when the predefined minimum number of points has been assigned during the step of assigning. Such a specific embodiment offers the advantage of further minimizing faulty detections.

In the step of ascertaining, it is particularly possible to ascertain the flank plane of the curbstone with the aid of a calculated center point of mass of the assigned points. Such a specific development offers the advantage that a position of the flank plane can be ascertained in an even more reliable and precise manner.

In addition, a first coordinate system may be used in the step of detecting. A second coordinate system may then be used in the step of projecting, in the step of assigning and, additionally or alternatively, in the step of ascertaining. The first coordinate system may include image coordinates and the second coordinate system may include world coordinates. Such a specific embodiment offers the advantage of enabling a reliable curbstone detection, for which a reference frame that includes the vehicle and the curbstone is able to be utilized.

In addition, the method may include a step of calculating a distance between the vehicle and the flank plane of the curbstone ascertained in the step of ascertaining. The distance is able to be calculated with the aid of world coordinates. In the step of calculating it is possible, in particular, to calculate a distance between at least one wheel or tire of the vehicle and the flank plane of the curbstone calculated in the step of ascertaining. Such a specific embodiment offers the advantage of allowing a reliable distance control between vehicle and curbstone.

The method may include a step of supplying a warning signal if the distance calculated in the step of calculating is less than a predefined safety distance. Such a specific embodiment offers the advantage of providing for an increase in the driving safety and the driving comfort.

In addition, the method may include a step of tracking the at least one line segment, the assigned points, and additionally or alternatively, the flank plane over the time, and additionally or alternatively, in response to a movement of the vehicle. The step of tracking may take place with the aid of image data that represent image data recorded in a temporally sequential order by the camera device of the vehicle. Such a specific embodiment is advantageous insofar as it allows for a plausibilization of the curbstone detection and also allows for a further improvement in the detection reliability.

In addition, the method may include a step of ascertaining the plurality of three-dimensionally triangulated points in the environment of the vehicle. The three-dimensionally triangulated points may correspond to object points in the environment of the vehicle. The step of ascertaining is able to be executed with the aid of image data from the at least one camera device. The step of ascertaining may be carried out using an algorithm for obtaining structure from the movement, in particular. Such a specific embodiment offers the advantage of making it possible to obtain a reliable and accurate representation of the vehicle environment.

The approach introduced in this case furthermore provides a device that is designed to execute, trigger and/or implement the steps of a variant of a method introduced here in corresponding devices. This variant of an embodiment of the present invention in the form of a device may also be used for rapidly and efficiently achieving the objective on which the present invention is based.

To do so, the device may include at least one arithmetic unit for processing signals or data, at least one memory unit for storing signals or data, at least one interface to a sensor or an actuator for reading in sensor signals from the sensor or for outputting data or control signals to the actuator, and/or at least one communications interface for reading in or outputting data, which are embedded in a communications protocol. For example, the arithmetic unit may be a signal processor, a microcontroller or the like, and the memory unit may be a flash memory, an EPROM or a magnetic memory unit. The communications interface may be set up to read in or output data in a wireless and/or a wire-bound manner, and a communications interface, which can read in or output wire-bound data, is able to read in these data from a corresponding data-transmission line, for instance electrically or optically, or to output these data onto a corresponding data-transmission line.

In this particular case, a device may be understood to denote an electrical device that processes sensor signals and outputs control and/or data signals as a function thereof. The device may have an interface that is able to be developed as hardware and/or software. In case of a hardware development, the interfaces may be part of what is known as a system ASIC, for instance, which includes a wide range of different functions of the device. However, it is also possible that the interfaces are autonomous, integrated switching circuits or are at least partially made up of discrete components. In case of a software development, the interfaces may be software modules that are available on a microcontroller, for example, in addition to other software modules.

In one advantageous development, the device processes image data. For this purpose, for instance, the device is able to access sensor signals such as camera signals and video signals from the at least one camera device. The device may be designed to provide processed image data that describe a curbstone.

A system for curbstone control for a vehicle is introduced, the system having the following features:

At least one camera device for providing image data of an environment of the vehicle; and a specific embodiment of the aforementioned device which is able to be connected or is connected to the at least one camera device in a manner that allows a data transmission.

In conjunction with the system for curbstone control, a specific embodiment of the aforementioned device may advantageously be employed or used for detecting a curbstone in the environment of the vehicle.

Also advantageous is a computer program product or a computer program having program code which may be stored on a machine-readable carrier or storage medium such as a semiconductor memory, a hard-disk memory or an optical memory, and which is used for executing, implementing and/or triggering the steps of the method as recited in one of the afore-described specific embodiments, in particular when the program product or program is executed on a computer or a device.

Exemplary embodiments of the approach described here are shown in the figures and explained in greater detail below.

DETAILED DESCRIPTION OF EXAMPLE EMBODIMENTS

Figure 1:
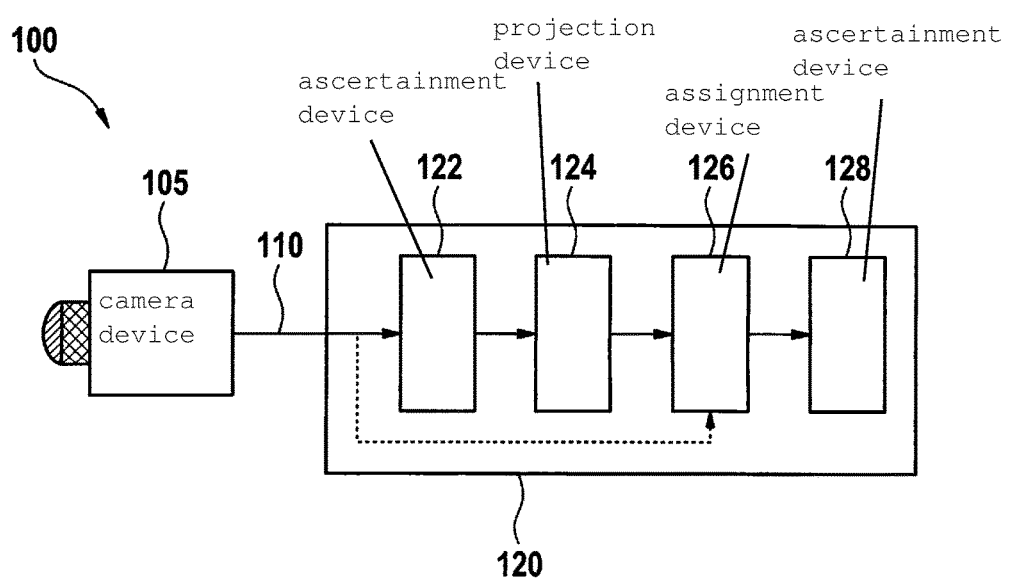
FIG. 1 shows a schematic representation of a system according to one exemplary embodiment.

In the following description of advantageous exemplary embodiments of the present invention, identical or similar reference numerals are used for the elements shown in the various figures that are acting in a similar manner, and a repeated description of these elements is omitted.

FIG. 1 shows a schematic representation of a system 100 according to one exemplary embodiment. System 100 is designed to carry out a curbstone control or curbstone monitoring for a vehicle. System 100 is therefore able to be used in a vehicle, especially in a motor vehicle or road vehicle.

System 100 includes at least one camera device 105 for providing image data 110 of an environment of the vehicle. According to the exemplary embodiment shown in FIG. 1, system 100 has only one camera device 105 by way of example. Image data 110 represent the environment of the vehicle. Camera device 105, for example, is a vehicle camera, which is able to be developed as a still camera and/or as a video camera. According to the exemplary embodiment shown in FIG. 1, camera device 105 has a fish-eye lens. Camera device 105 is designed to provide image data 110.

In addition, system 100 has a detection device 120 or device 120 for detecting a curbstone in the environment of the vehicle. Detection device 120 is connected to camera device 105 in a manner that allows a transmission of data. Thus, detection device 120 is set up to receive or read in image data 110 from camera device 105.

Detection device 120 is designed to detect a curbstone in the environment of the vehicle in which system 100 is disposed for use. In this case, detection device 120 is developed to detect the curbstone with the aid of image data 110 from camera device 105. Detection device 120 includes a recognition device 122, a projection device 124, an assignment device 126 and an ascertainment device 128.

Ascertainment device 122 is designed to use image data 110 from camera device 105. For example, ascertainment device 122 is set up to read in image data 110 from camera device 105 or from an interface to camera device 105. Ascertainment device 122 is developed to detect at least one line segment belonging to the curbstone with the aid of read-in image data 110. Ascertainment device 122 is also developed to deliver the detected line segment or an item of information about the detected line segment to projection device 124.

Projection device 124 is developed to project the at least one line segment onto a ground plane of the environment in order to generate a projected line segment. Furthermore, ascertainment device 124 is developed to make the projected line segment available for assignment device 126.

Assignment device 126 is designed to assign at least a subset of a plurality of three-dimensionally triangulated points in the environment of the vehicle to the at least one line segment. Assignment device 126 is developed to allocate the three-dimensionally triangulated points to the at least one line segment as a function of a position of the points relative to a position of camera device 105, relative to a starting point of the projected line segment, and relative to an end point of the projected line segment. The three-dimensionally triangulated points correspond to object points in the environment of the vehicle. Assignment device 126 is furthermore developed to forward the assigned points, or an item of information about the assigned points, to ascertainment device 128.

Ascertainment device 128 is set up to ascertain a flank plane of the curbstone with the aid of the assigned points. In particular, ascertainment device 128 is designed to determine at least the flank plane of the curbstone.

A method of functioning of detection device 120 will be described in even greater detail in the following text with reference to the following figures.

Figure 2:
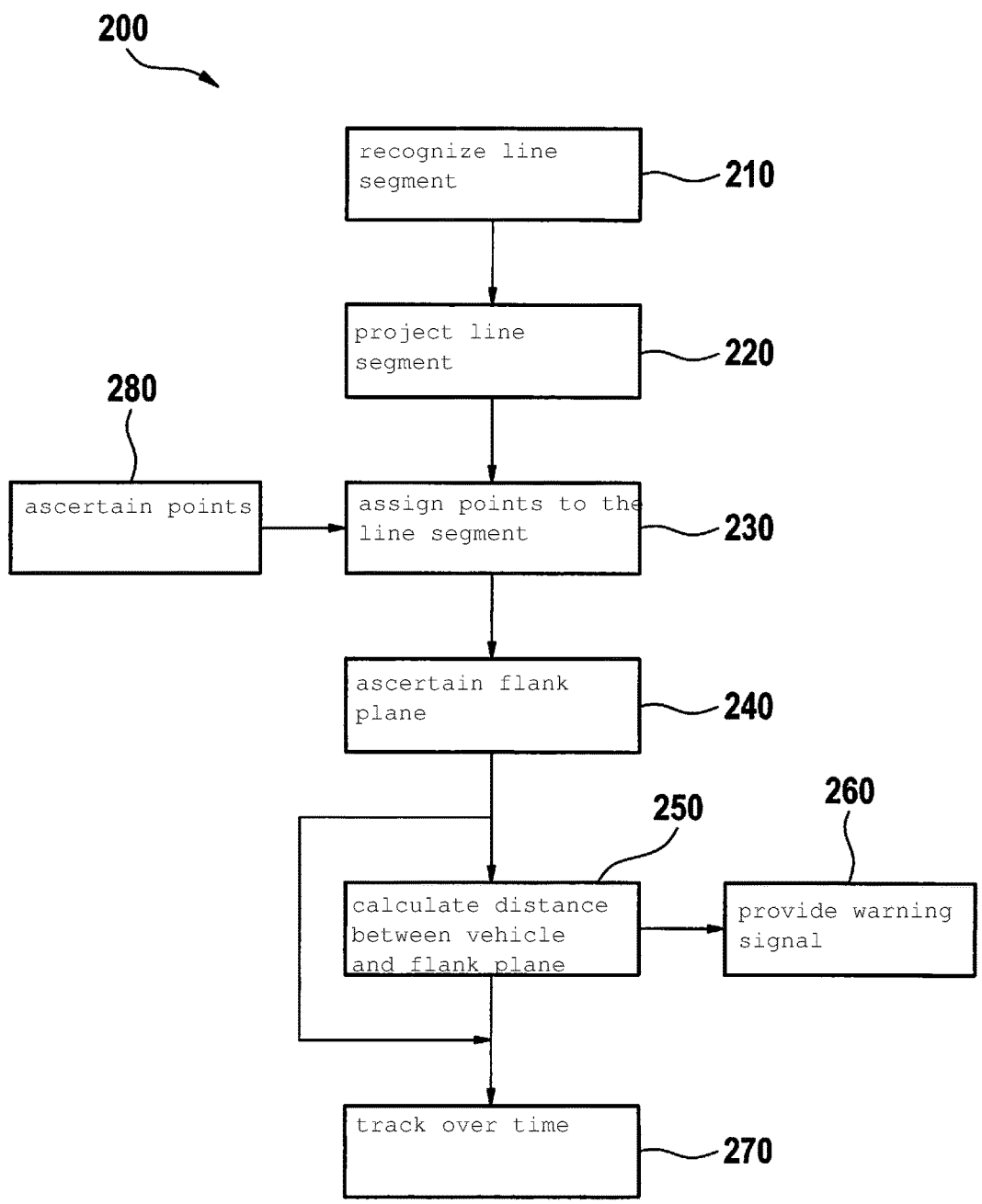
FIG. 2 shows a flow diagram of a method according to one exemplary embodiment.

FIG. 2 shows a flow diagram of a method 200 for detecting according to one exemplary embodiment. Method 200 is able to be executed for the purpose of detecting a curbstone in an environment of a vehicle. Method 200 for detecting is executable in conjunction with or while using detection device 120 from FIG. 1 or a similar detection device.

Method 200 for detecting furthermore includes a step 210 of recognizing, in which at least one line segment that is part of the curbstone is recognized with the aid of image data. The image data are read in by an interface to at least one camera device of the vehicle and represent the environment of the vehicle. In a step 220 of projecting, which is able to be executed subsequent to step 210 of recognizing, the at least one line segment recognized in step 210 of recognizing is projected onto a ground plane of the environment in order to generate a projected line segment.

Subsequently, in a step 230 of assigning, at least one subset of a plurality of three-dimensionally triangulated points in the environment of the vehicle is assigned to the at least one line segment as a function of a position of the points relative to a position of the camera device, relative to a starting point of the projected line segment, and relative to an end point of the projected line segment. The three-dimensionally triangulated points correspond to object points in the environment of the vehicle. In a step 240 of ascertaining, a flank plane of the curbstone is ascertained with the aid of the points assigned in step 230 of assigning.

According to one exemplary embodiment, method 200 furthermore includes a step 250 of calculating, in which a distance is calculated between the vehicle and the flank plane of the curbstone ascertained in step 240 of ascertaining. In a further, optional step 260 of providing, a warning signal is provided in the event that the distance calculated in step 250 of calculating lies below a predefined safety distance.

According to a further exemplary embodiment, method 200 also includes a step 270 of tracking the at least one line segment, the assigned points and/the flank plane over the time and/or in response to a movement of the vehicle. Step 270 of tracking can be executed following step 240 of ascertaining or following step 250 of calculating.

According to one exemplary embodiment, method 200 also includes a step 280 of ascertaining the plurality of three-dimensionally triangulated points in the environment of the vehicle. Step 280 of ascertaining is able to be executed prior to step 230 of assigning.

According to one exemplary embodiment, in method 200 for detecting, a first coordinate system is used in step 210 of recognizing, and a second coordinate system is used in step 220 of projecting, in step 230 of assigning and/or in step 240 of ascertaining. The first coordinate system includes image coordinates, while the second coordinate system includes world coordinates. Optionally, the second coordinate system may also be used in step 250 of calculating, in step 270 of tracking and/or in step 280 of ascertaining.

According to a further exemplary embodiment, in step 240 of ascertaining, the flank plane is ascertained as a function of whether the assigned points are situated at a predefined distance interval from the ground plane of the environment, and/or whether a predefined minimum number of points has been assigned in step 230 of assigning. In particular, in step 240 of ascertaining, the flank plane of the curbstone is ascertained with the aid of a calculated center of mass of the assigned points.

Figure 3:
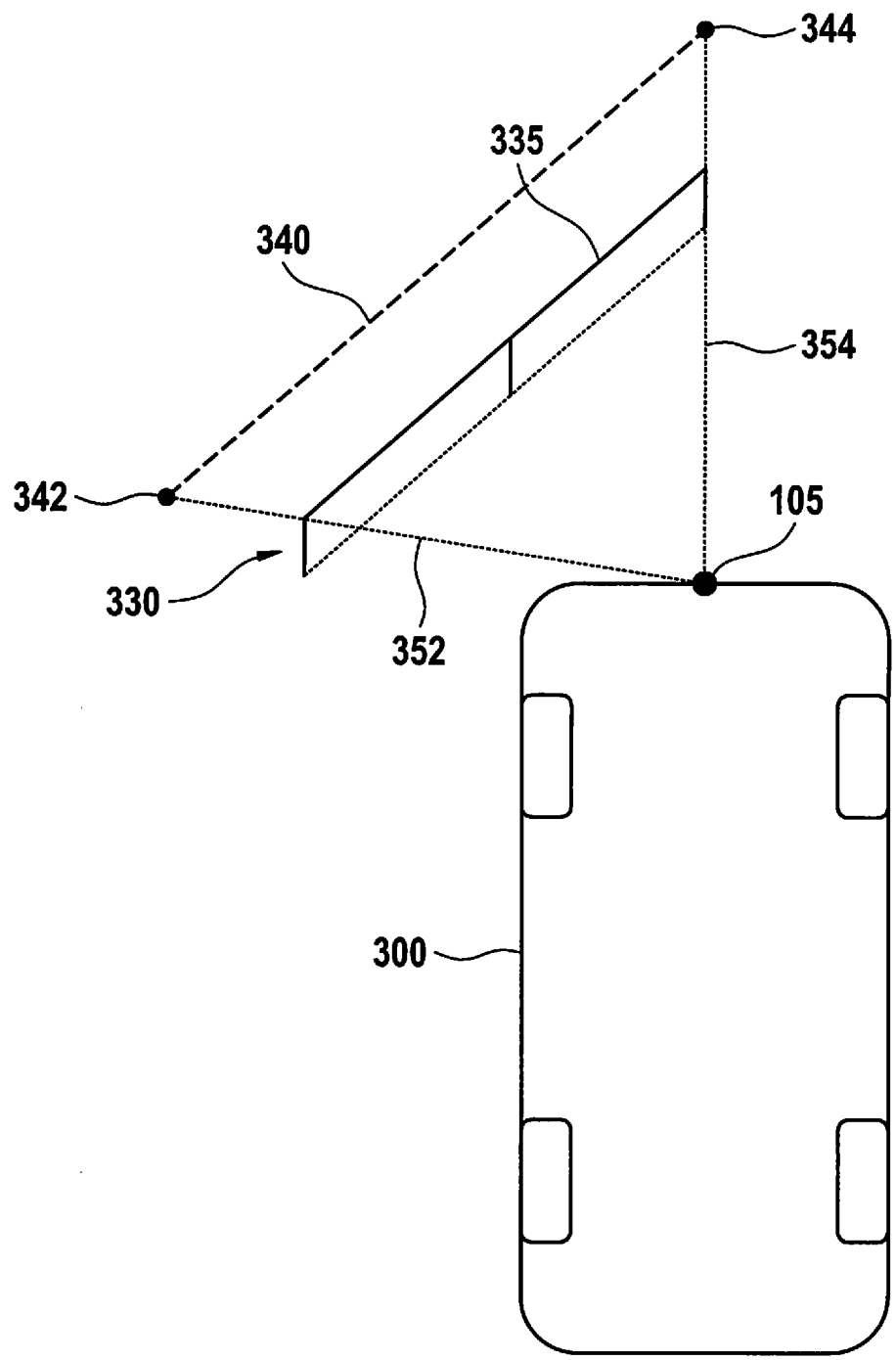
FIG. 3 shows a schematic representation of a vehicle having the system of FIG. 1, as well as an environment of the vehicle.

FIG. 3 shows a schematic representation of a vehicle 300 with the system from FIG. 1 and an environment of vehicle 300. Vehicle 300 thus is equipped with the system from FIG. 1. According to one specific embodiment, vehicle 300 may also include a system for curbstone control that is similar to the system from FIG. 1. For drawing-related reasons FIG. 3 shows only camera device 105 of the system.

A curbstone 330 is located in the environment of vehicle 300. The detection device of the system has detected a plurality of line segments of curbstone 330, for instance; however, only one line segment 335 has been denoted by a reference numeral in FIG. 3 by way of example. In this instance, line segment 335 represents an edge of curbstone 330. Furthermore, for illustration purposes, a projection 340 of the curbstone onto the ground or the ground plane has been symbolically sketched in the environment of vehicle 300. In other words, at least one projected line segment 340 is shown, which represents a projection of line segment 335. Projected line segment 340 has a starting point 342 and an end point 344. A first sight beam 352 to starting point 342 extends between camera device 105 and starting point 342. A second sight beam 354 to end point 344 extends between camera device 105 and end point 344.

In other words, FIG. 3 shows a schematic plan view of vehicle 300 and the environment of vehicle 300. Line segment 335, which was detected at the edge of curbstone 330 and which is projected onto the ground as projected line segment 340, results as an output of a line-detection algorithm of the detection device of the system.

Figure 4:
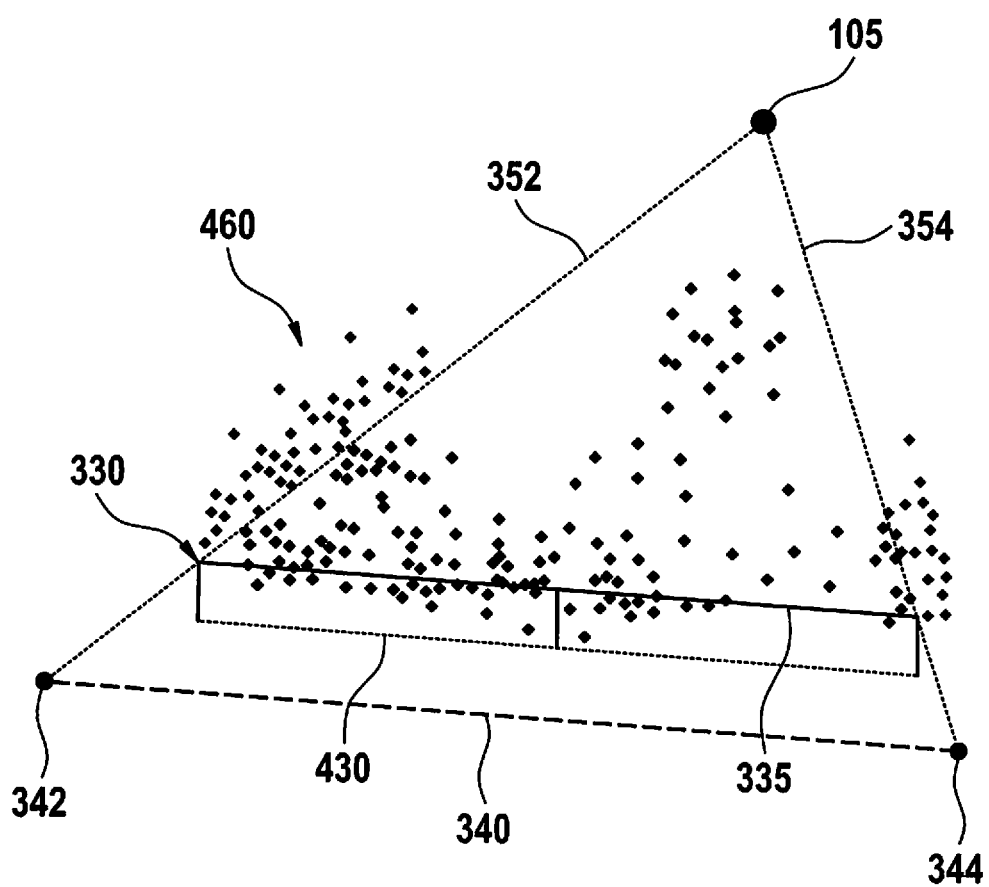
FIG. 4 shows a schematic representation of the environment of the vehicle of FIG. 3 when a curbstone is detected.

FIG. 4 shows a schematic representation of the environment of the vehicle from FIG. 3 when a curbstone is detected. Shown in the representation of FIG. 4 are camera device 105, curbstone 330, line segment 335, projected line segment 340 which represents a projection of curbstone 330 onto the ground from the direction of camera device 105, starting point 342, end point 344, first sight beam 352 and second sight beam 354 as well as a perpendicular projection 430 of curbstone 330 onto the ground or the ground plane, and a point cloud or a plurality of three-dimensionally triangulated points 460.

Starting point 342, end point 344 and a position of camera device 105 define or span a triangle. The plurality of three-dimensionally triangulated points 460 is situated within and outside the triangle. In addition, a separation plane is defined or spanned by starting point 342, end point 344 and the position of camera device 105.

For the assignment of three-dimensionally triangulated points 460 to the at least one line segment 335 of curbstone 330 or to projected line segment 340, the detection device of the system from FIG. 1 or the method from FIG. 2 carries out a check. The check is implemented to ascertain whether the three-dimensionally triangulated points 460 are situated within the triangle shown in FIG. 4 when the points are projected onto the separation plane. As a result, the check is carried out with the aid of a triangle criterion. Points 460 situated within the triangle and thus satisfying the triangle criterion are assigned, and points 460 situated outside the triangle are disregarded.

In other words, FIG. 4 shows a schematic frontal view, and the separation plane represented by the triangle is defined by starting point 342, end point 344 and the position of camera device 105. A search is carried out for the particular triangulated points 460 of the point cloud that are situated in sufficient proximity to the separation plane. Furthermore, it is assumed that these points 460 are situated around the edge of curbstone 330, for example.

Figure 5:
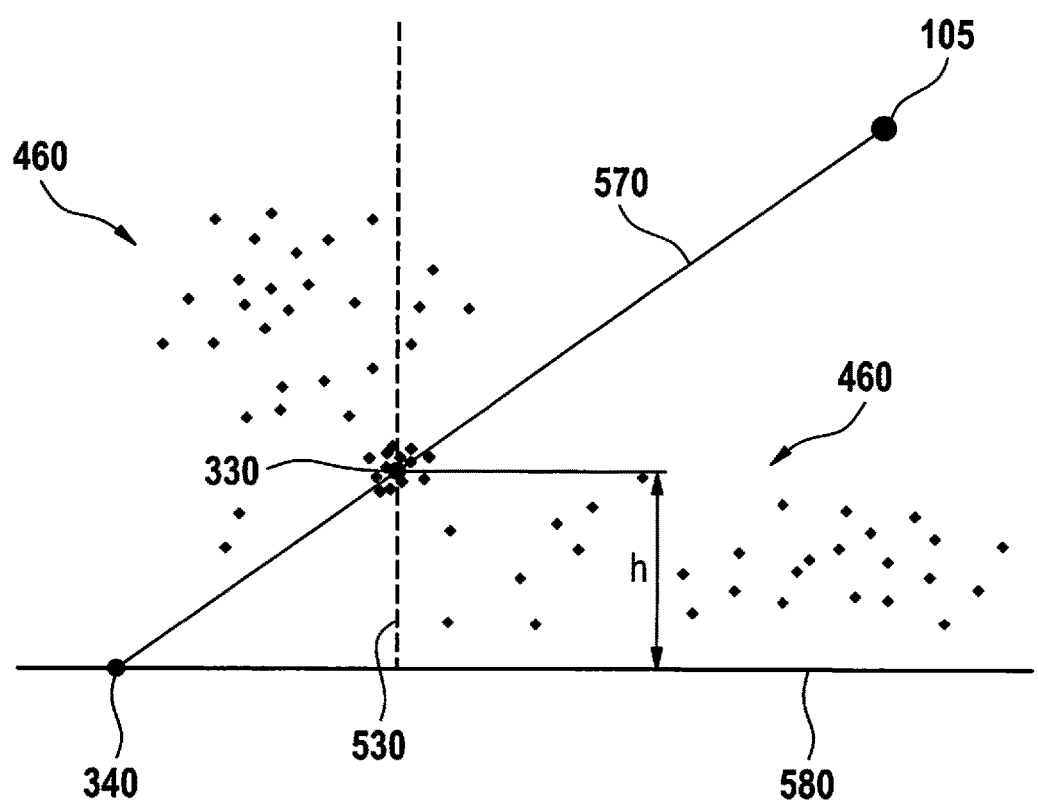
FIG. 5 shows a schematic representation of the environment of the vehicle of FIG. 3 or FIG. 4 during the curbstone detection.

FIG. 5 shows a schematic representation of the environment of the vehicle from FIG. 3 or FIG. 4 during the curbstone detection. In contrast to FIG. 4, the environment of the vehicle in FIG. 5 is shown in a schematic side view. In the representation of FIG. 5, camera device 105, curbstone 330, projected line segment 340, the plurality of three-dimensionally triangulated points 460, a plane 530 of curbstone 330, which represents the flank plane and is vertical in this particular instance, separation plane 570, a ground plane 580 and a height h are depicted. Height h, for instance, corresponds to an assumed or ascertained height of curbstone 330 or an edge of curbstone 330.

In the illustration of FIG. 5, points 460 are situated along both sides of separation plane 570 and, by way of example, in separation plane 570 as well. In order to assign three-dimensionally triangulated points 460 to the at least one line segment 335 of curbstone 330 or to projected line segment 340, the detection device of the system from FIG. 1 or the method from FIG. 2 carries out a check. The check is performed to ascertain whether three-dimensionally triangulated points 460 are maximally situated at a predefined distance from separation plane 570. Thus, the check is performed on the basis of a plane-distance criterion. Points 460 that are maximally situated at the predefined distance from separation plane 570 and consequently satisfy the plane-distance criterion, are assigned, while other points 460 that are situated at a distance that is greater than the predefined distance from separation plane 570 are disregarded.

In other words, a distance, in particular a perpendicular distance, between triangulated points 460 and separation plane 570 is measured. If enough points 460 are present, the vertical plane 530 of curbstone 330 is able to be reconstructed based on the assumption that curbstone 330 itself is parallel to ground plane 580 so that vertical plane 530 or flank plane 530 of the same is essentially perpendicular to ground plane 580. Now, a distance, in particular a perpendicular distance, between vertical plane 530 and tires or wheels of the vehicle is able to be measured. A warning signal may be output or made available if one of the wheels comes too close to curbstone 330, for example.

With reference to FIGS. 1 through 5, an exemplary algorithm for curbstone detection or curbstone control is described which has only six, or up to six, main steps, for example.

In a step of line detection or line recognition, at least one line segment 335 is recognized with the aid of detection device 120 or during an execution of method 200. Since a structure of a curbstone 330 has straight lines in most cases, the proposed algorithm makes use of this fact.

During a step of line projection, at least one calibrated camera, i.e., camera device 105 having a fish-eye lens, is used by detection device 120 or during the execution of method 200. In the process, for example, the position of camera device 105 in world coordinates is known so that image coordinates are able to be converted into world coordinates. This means that the lines or line segments 335 that were calculated in the form of image coordinates during the line recognition are able to be projected onto the ground or ground plane 580, and a switch to a three-dimensional world map display is able to take place.

In a step of a triangulation or ascertainment of three-dimensionally triangulated points 460, an algorithm is employed which operates according to the principle of what is known as structure from motion (SfM), for instance. However, there are several types of methods available for reconstructing the environment in the form of a point cloud. This cloud may have a multitude of three-dimensionally triangulated points 460 around vehicle 300, which are utilized by the proposed algorithm in order to obtain, among other things, an item of height information regarding a height h of the edge of curbstone 330 from the environment or image data 110.

In step 230 of assigning, points 460 are assigned to line segments 335 or disregarded with the aid of the obtained input data, e.g., on the basis of the plane-distance criterion, see FIG. 5, and the triangle criterion, see FIG. 4.

Three points in a three-dimensional world are given for the plane-distance criterion. Said points are beginning point 342 or starting point 342 of a projected line segment 340 on the ground, end point 344 of projected line segment 340, also on the ground, and the camera position, i.e., the position of camera device 105. It is now possible to define separation plane 570 from these three points and to then measure or ascertain the perpendicular distance of points 460 or elements of the point cloud from separation plane 570. A minimal tolerance range may be taken into account for this permissible distance. If the distance lies within this tolerance range, then the triangle criterion may be evaluated; in the other case, point 460 pertaining to current line segment 335 is disregarded.

The triangle criterion is suited for restricting possible unsuitable assignments that the plane-distance criterion potentially still permits since a plane represents an infinitive object. For this purpose, starting point 342 and end point 344 of projected line segment 340 on the ground, and also the camera position are examined once again, but now the fact is utilized that these points always form a triangle in the same plane that is defined as separation plane 570. Of interest are the particular points 460 of the point cloud or the projection of the point cloud onto separation plane 570 that lie within the boundaries of this triangle. In other words, a region of interest in three dimensions is defined on separation plane 570.

If a triangulated three-dimensional point 460 satisfies the aforementioned criteria, then this point 460 belongs to current line segment 335. Coordinates of point 460 are stored together with line segment 335, such as in a structure. A check is carried out between each line segment 335 and triangulated three-dimensional points 460, and the points for 160 are assigned to the next-closest plane if more than one of the criteria satisfied.

Once the assignment has taken place, a decision is made in a decision step whether average height h of the points is high enough to be considered a curbstone 330. A rule of thumb states that the more points 330 would be assignable, the greater the certainty that such an object having a calculated height h exists. A lower limit or minimum number for the number of assigned points 460 may be taken into account in order to avoid faulty conclusions.

It may be assumed that the average height h of points 460 lies in a previously defined interval that may be considered a curbstone 330. In this case, the center of gravity or the center of mass of assigned points 460 that are projected onto separation plane 570 is able to be calculated. On the assumption that the upper end of a curbstone 330 is parallel to ground plane 580 and its flank is inclined or perpendicular to ground plane 580, it is possible to define vertical plane 530 of one side of curbstone 330 with the aid of a point 460 and a line on separation plane 570 that runs through this point 460. Now, the perpendicular distance of the wheels of the vehicle in relation to this vertical plane 530, for instance, is able to be measured and a decision can be made whether or not the resulting value lies below a threshold value.

In order to provide even greater certainty with regard to the existence of a curbstone 330 and to reduce a number of possibly erroneous detections, the objects may be tracked over time. Line tracking may be carried out for this purpose.

If an exemplary embodiment includes an "and/or" linkage between a first feature and a second feature, then this should be interpreted as meaning that the exemplary embodiment according to one specific embodiment includes both the first feature and the second feature, and according to a further specific embodiment, includes either only the first feature or only the second feature.

What is claimed is:

1. A method for detecting a curbstone in an environment of a vehicle, the method comprising:
    detecting at least one line segment belonging to the curbstone with the aid of image data that are read in by an interface to at least one camera device of the vehicle, the image data representing the environment of the vehicle;
    projecting the at least one line segment onto a ground plane of the environment in order to generate a projected line segment;
    assigning at least one subset of a plurality of three-dimensionally triangulated points in the environment of the vehicle to the at least one line segment as a function of a position of the points relative to a position of the camera device, relative to a starting point of the projected line segment, and relative to an end point of the projected line segment, the three-dimensionally triangulated points corresponding to object points in the environment of the vehicle; and
    ascertaining a flank plane of the curbstone with the aid of the assigned points, wherein the assigning step includes checking whether the three-dimensionally triangulated points when projected into a projection plane that is defined by the position of the camera device, the starting point of the projected line segment, and the end point of the projected line segment, are situated within a triangle that is defined by the position of the camera device, the starting point of the projected line segment, and the end point of the projected line segment.

2. The method as recited in claim 1, wherein the assigning step includes checking whether the three-dimensionally triangulated points are situated at a predefined distance from a separation plane, the separation plane being defined by the position of the camera device, the starting point of the projected line segment and the end point of the projected line segment.

3. The method as recited in claim 1, wherein the ascertaining step includes ascertaining the flank plane as a function of whether the assigned points are situated at a predefined distance interval from the ground plane of the environment.

4. The method as recited in claim 1, wherein the ascertaining step ascertaining the flank plane as a function of whether a predefined minimum number of points was assigned in the assigning step.

5. The method as recited in claim 1, wherein the ascertaining step includes ascertaining the flank plane of the curbstone with the aid of a calculated center point of mass of the assigned points.

6. The method as recited in claim 1, wherein a first coordinate system is used in the detecting step, and a second coordinate system is used in at least one of the projecting step, the assigning step, and the ascertaining step, the first coordinate system having image coordinates and the second coordinate system having world coordinates.

7. The method as recited in claim 1, further comprising:
calculating a distance between the vehicle and the flank plane of the curbstone ascertained in the ascertaining step.

8. The method as recited in claim 7, further comprising:
providing a warning signal if the distance calculated in the calculating step lies below a predefined safety distance.

9. The method as recited in claim 1, further comprising:
tracking at least one of the at least one line segment, the assigned points, and the flank plane, the tracking being at least one of tracking over time and in response to a movement of the vehicle.

10. The method as recited in claim 1, further comprising:
ascertaining the plurality of three-dimensionally triangulated points in the environment of the vehicle, the three-dimensionally triangulated points corresponding to object points in the environment of the vehicle.

11. A device designed to detect a curbstone in an environment of a vehicle, the device designed to:
detect at least one line segment belonging to the curbstone with the aid of image data that are read in by an interface to at least one camera device of the vehicle, the image data representing the environment of the vehicle;
project the at least one line segment onto a ground plane of the environment in order to generate a projected line segment;
assign at least one subset of a plurality of three-dimensionally triangulated points in the environment of the vehicle to the at least one line segment as a function of a position of the points relative to a position of the camera device, relative to a starting point of the projected line segment, and relative to an end point of the projected line segment, the three-dimensionally triangulated points corresponding to object points in the environment of the vehicle; and
ascertain a flank plane of the curbstone with the aid of the assigned points, wherein in the assigning the device checks whether the three-dimensionally triangulated points when projected into a projection plane that is defined by the position of the camera device, the starting point of the projected line segment, and the end point of the projected line segment, are situated within a triangle that is defined by the position of the camera device, the starting point of the projected line segment, and the end point of the projected line segment.

12. A system for curbstone control for a vehicle, the system comprising:
at least one camera device to for provide image data of an environment of the vehicle; and
a device able to be connected or is connected to the at least one camera device in a manner that allows a data transmission, the device designed to detect a curbstone in the environment of a vehicle, the device designed to detect at least one line segment belonging to the curbstone with the aid of the image data from the at least one camera device of the vehicle, the image data representing the environment of the vehicle, the device designed to project the at least one line segment onto a ground plane of the environment in order to generate a projected line segment, the device further designed to assign at least one subset of a plurality of three-dimensionally triangulated points in the environment of the vehicle to the at least one line segment as a function of a position of the points relative to a position of the camera device, relative to a starting point of the projected line segment, and relative to an end point of the projected line segment, the three-dimensionally triangulated points corresponding to object points in the environment of the vehicle, and the device designed to ascertain a flank plane of the curbstone with the aid of the assigned points, wherein in the assigning the device checks whether the three-dimensionally triangulated points when projected into a projection plane that is defined by the position of the camera device, the starting point of the projected line segment, and the end point of the projected line segment, are situated within a triangle that is defined by the position of the camera device, the starting point of the projected line segment, and the end point of the projected line segment.

13. A non-transitory machine-readable storage medium on is stored a computer program for detecting a curbstone in an environment of a vehicle, the computer program, when executed by a processor, causing the processor to perform:
detecting at least one line segment belonging to the curbstone with the aid of image data that are read in by an interface to at least one camera device of the vehicle, the image data representing the environment of the vehicle;
projecting the at least one line segment onto a ground plane of the environment in order to generate a projected line segment;
assigning at least one subset of a plurality of three-dimensionally triangulated points in the environment of the vehicle to the at least one line segment as a function of a position of the points relative to a position of the camera device, relative to a starting point of the projected line segment, and relative to an end point of the projected line segment, the three-dimensionally triangulated points corresponding to object points in the environment of the vehicle; and
ascertaining a flank plane of the curbstone with the aid of the assigned points, wherein the assigning step includes checking whether the three-dimensionally triangulated points when projected into a projection plane that is defined by the position of the camera device, the starting point of the projected line segment, and the end point of the projected line segment, are situated within a triangle that is defined by the position of the camera device, the starting point of the projected line segment, and the end point of the projected line segment.

* * * * *